US012223692B2

(12) United States Patent
Xu et al.

(10) Patent No.: US 12,223,692 B2
(45) Date of Patent: Feb. 11, 2025

(54) METHOD AND SYSTEM FOR IMAGE-BASED RESERVOIR PROPERTY ESTIMATION USING MACHINE LEARNING

(71) Applicant: ARAMCO SERVICES COMPANY, Houston, TX (US)

(72) Inventors: Chicheng Xu, Houston, TX (US); Weichang Li, Katy, TX (US); Yaser Alzayer, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 579 days.

(21) Appl. No.: 17/580,079

(22) Filed: Jan. 20, 2022

(65) Prior Publication Data

US 2022/0237891 A1  Jul. 28, 2022

Related U.S. Application Data

(60) Provisional application No. 63/140,491, filed on Jan. 22, 2021.

(51) Int. Cl.
| | |
|---|---|
| *G06V 10/764* | (2022.01) |
| *E21B 47/002* | (2012.01) |
| *G01V 3/02* | (2006.01) |
| *G01V 3/14* | (2006.01) |
| *G06N 3/08* | (2023.01) |
| *G06V 10/50* | (2022.01) |
| *G06V 10/56* | (2022.01) |

(Continued)

(52) U.S. Cl.
CPC .......... *G06V 10/764* (2022.01); *E21B 47/002* (2020.05); *G01V 3/02* (2013.01); *G01V 3/14* (2013.01); *G06N 3/08* (2013.01); *G06V 10/507* (2022.01); *G06V 10/56* (2022.01); *G06V 10/763* (2022.01); *G06V 10/771* (2022.01); *G06V 10/82* (2022.01); *E21B 2200/22* (2020.05)

(58) Field of Classification Search
CPC .... G06V 10/764; G06V 10/56; G06V 10/763; G06V 10/771; G06V 10/82; G06V 10/507; E21B 47/002; E21B 2200/22; G01V 3/02; G01V 3/14; G06N 3/08
USPC ........................................................ 382/109
See application file for complete search history.

(56) References Cited

U.S. PATENT DOCUMENTS 10,410,092 B1    9/2019  Chen et al.

OTHER PUBLICATIONS

International Search Report Issued in Application No. PCT/US2022/013305, dated Apr. 20, 2022, 3 pages.

(Continued)

*Primary Examiner* — Mark Roz
(74) *Attorney, Agent, or Firm* — Osha Bergman Watanabe & Burton LLP

(57) ABSTRACT

A method may include obtaining core image data regarding a geological region of interest. The method may further include obtaining well log data regarding the geological region of interest from one or more wells. The method may further include determining a sliding window that corresponds to a predetermined window size. The method may further include determining various quantitative image attributes using the core image data, the well log data, and the sliding window. The quantitative image attributes may be determined in a continuous manner by moving the sliding window along the core image data. The method may further include generating predicted rock data for the geological region of interest using the quantitative image attributes, a machine-learning algorithm, and a machine-learning model.

14 Claims, 10 Drawing Sheets

(51) Int. Cl.
*G06V 10/762* (2022.01)
*G06V 10/771* (2022.01)
*G06V 10/82* (2022.01)

(56) References Cited

OTHER PUBLICATIONS

Written Opinion Issued in Application No. PCT/US2022/013305, dated Apr. 20, 2022, 7 pages.
"Valentin Manuel Blanco: Deep Learning Methods on Geological Reservoir Borehole Log Images and Applications;" Dec. 31, 2018; pp. 1-221; XP055904628; Retrieved from the Internet: URL: http://http://cbpfindex.cbpf.br/publication_pdfs/dissertacaoDeMestrado_2021-07-19-21-16-38ZGlzc2VydGFjYW9EZU1Ic3RyYWRv.pdf (221 pages).

METHOD AND SYSTEM FOR IMAGE-BASED RESERVOIR PROPERTY ESTIMATION USING MACHINE LEARNING

CROSS-REFERENCE TO RELATED APPLICATIONS

This application claims priority to U.S. Provisional Patent Application Ser. No. 63/140,491, titled "METHOD AND SYSTEM FOR IMAGE-BASED RESERVOIR PROPERTY ESTIMATION USING MACHINE LEARNING," which was filed on Jan. 22, 2021, and is incorporated herein by reference.

BACKGROUND

Image data recorded at different scales are being used by petroleum industry to describe or characterize subsurface reservoirs, including core images, borehole image logs, and seismic cross sections. Core samples may be analyzed through various processes, such as through core scans performed using gamma rays as well as through chemical testing as well as visual examination. For example, a core specimen or a core plug may be obtained from a sidewall of a wellbore in a well and then sent to a laboratory for further testing. Thus, core data may provide information regarding various rock properties within the subsurface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, core image data regarding a geological region of interest. The method further includes obtaining, by a computer processor, well log data regarding the geological region of interest from one or more wells. The method further includes determining, by the computer processor, a sliding window that corresponds to a predetermined window size. The method further includes determining, by the computer processor, various quantitative image attributes using the core image data, the well log data, and the sliding window. The quantitative image attributes may be selected from a group consisting of color values, hue values, saturation values, and entropy values. The quantitative image attributes are determined in a continuous manner by moving the sliding window along the core image data. The method further includes generating, by the computer processor, predicted rock data for the geological region of interest using the quantitative image attributes, a machine-learning algorithm, and a machine-learning model.

In general, in one aspect, embodiments relate to a system that includes a logging system coupled to a logging tool. The system further includes a well system coupled to the logging system and a wellbore. The system further includes a reservoir properties estimator that includes a computer processor. The reservoir properties estimator is coupled to the logging system and the well system. The reservoir properties estimator obtains core image data regarding a geological region of interest. The reservoir properties estimator obtains well log data regarding the geological region of interest from one or more wells. The reservoir properties estimator determines a sliding window that corresponds to a predetermined window size. The reservoir properties estimator determines various quantitative image attributes using the core image data, the well log data, and the sliding window. The quantitative image attributes are determined in a continuous manner by moving the sliding window along the core image data. The reservoir properties estimator generates predicted rock data for the geological region of interest using the quantitative image attributes, a machine-learning algorithm, and a machine-learning model.

In general, in one aspect, embodiments relate to a non-transitory computer readable medium storing instructions executable by a computer processor. The instructions obtain core image data regarding a geological region of interest. The instructions further obtain well log data regarding the geological region of interest from one or more wells. The instructions further determine a sliding window that corresponds to a predetermined window size. The instructions further determine various quantitative image attributes using the core image data, the well log data, and the sliding window. The quantitative image attributes are determined in a continuous manner by moving the sliding window along the core image data. The instructions further generate predicted rock data for the geological region of interest using the quantitative image attributes, a machine-learning algorithm, and a machine-learning model.

In some embodiments, the machine-learning model is a neural network model that obtains various quantitative image attributes and well log data as various inputs to an input layer. The neural network model may output a predetermined facies as an output class based on the inputs, and the machine-learning model may be a supervised classification algorithm that trains the neural network model. In some embodiments, the machine-learning algorithm includes a K-means clustering algorithm that outputs the machine-learning model. The machine-learning model may include various clusters that are organized according to one or more visual rock types (VRTs) that are indexed by depth. In some embodiments, the machine-learning algorithm includes a K-nearest neighbors algorithm. The machine-learning model may include various neighbor nodes corresponding to various predetermined rock types. The machine-learning model may output the predicted rock data based on a proximity of various quantitative image attributes and well log data to one or more neighbor nodes among the neighbor nodes. In some embodiments, the machine-learning algorithm includes a regression algorithm. The predicted rock data may include one or more predicted rock properties at a predetermined depth in the geological region of interest. In some embodiments, a histogram including various bins are determined, by a computer processor and using the sliding window. A respective bin among the bins may correspond to the sliding window at a respective portion of the core image data. A quantitative image attribute may be a statistical parameter of the histogram, where the statistical parameter may be selected from a group consisting of a mean value, a median value, and a variance value. In some embodiments, the predetermined window size is a two-dimensional pixel area. The sliding window may generate a first quantitative image attribute for a first area of the core image data and a second quantitative image attribute for a second area of the core image data. A portion of the first area may overlap with a portion of the second area. In some embodiments, a quality control operation is performed on the quantitative image attributes. The quality control operation may remove at least one outlier from the quantitative image attributes using a cutoff threshold. In some embodiments, the predicted rock data includes a predicted rock facies at a predetermined depth in the geological region of interest. In some embodiments, a point core measurement is obtained at a predetermined depth in the geological region of interest, where the point core measurement may be selected from a group consisting of grain density, porosity, permeability, kerogen content, total organic carbon content, Poisson's ratio, and Young's modulus. The predicted rock data may be generated by the machine-learning model using the point core measurement. In some embodiments, a geological model is generated using the predicted rock data, and a well path is determined through the geological region of interest based on the geological model.

In light of the structure and functions described above, embodiments of the invention may include respective means adapted to carry out various steps and functions defined above in accordance with one or more aspects and any one of the embodiments of one or more aspect described herein.

Other aspects of the disclosure will be apparent from the following description and the appended claims.

DETAILED DESCRIPTION

Figure 1:
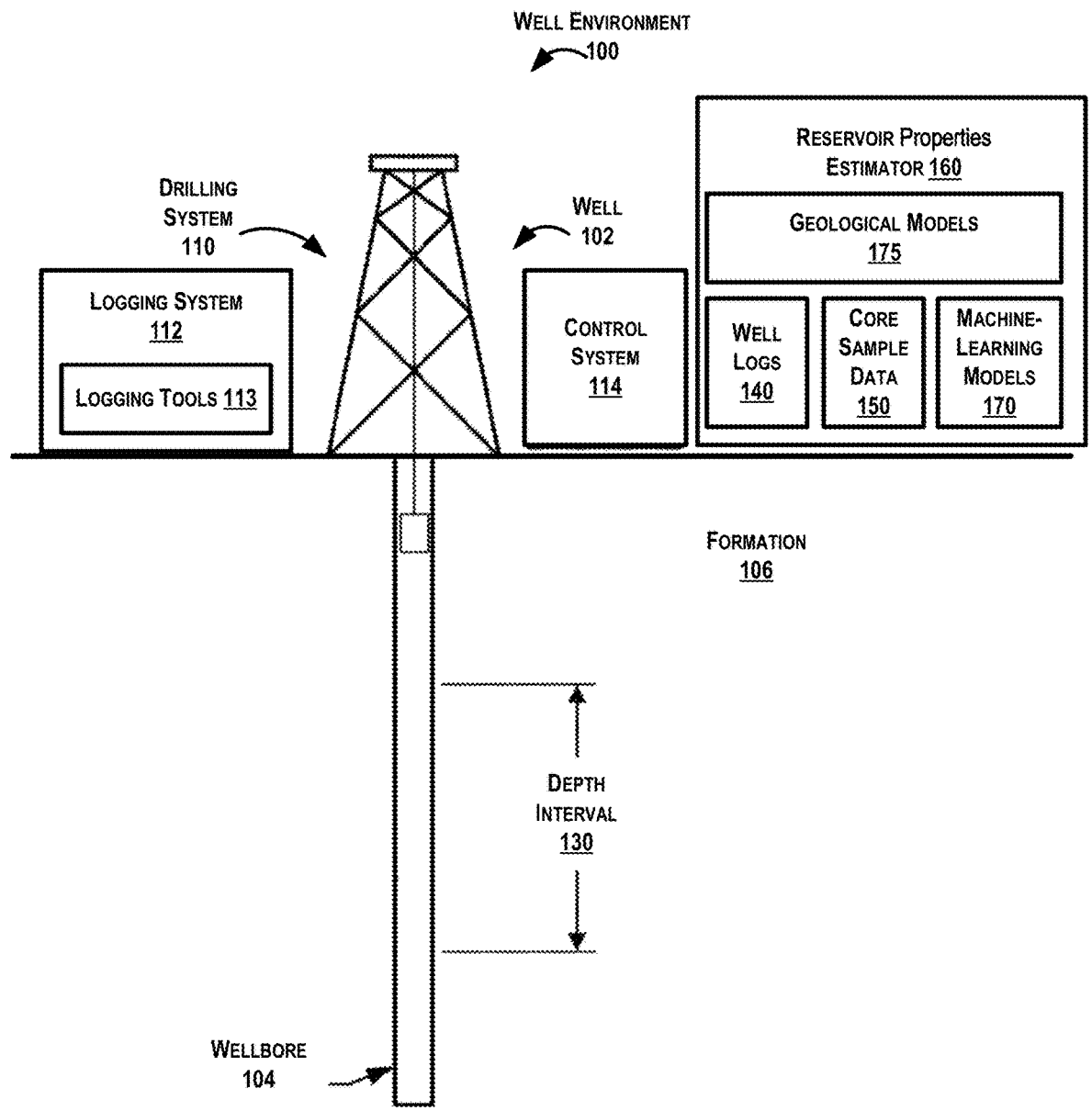
FIGS. 1 and 2 show systems in accordance with one or more embodiments of the technology.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Some embodiments include systems and methods that use machine-learning algorithms and machine-learning models to streamline the workflow of converting core image data (e.g., core photographs) into continuous quantitative features that can be integrated with a core analysis and/or well logs for integrative reservoir description and characterization. For example, digital photographs of slabbed cores may provide direct visual information for observing geological features and classifying facies or rock types. Thus, various rock properties may correspond to specific rock types, and a machine-learning model may predict rock types based on these quantitative image attributes. Examples of quantitative image attributes may include color or color spectrum, brightness and contrast, and texture variations acquired from core photos. Accordingly, some embodiments integrate core image data into machine-learning algorithms that include clustering, supervised classification, and/or regression to predict reservoir properties and classify facies types of the core samples.

In some embodiments, continuously depth-indexed high-resolution digital photos of slabbed core (i.e., core photos) are acquired under both white light and ultraviolet (UV) light for geological study. Observations based on core photos may assist in interpreting depositional features (e.g., bedding, grain size) and diagenetic features (e.g., vugs, nodules, fractures, and dolomitization) as well as verifying petrophysical, geomechanical, and geochemical reservoir properties and rock types. In some embodiments, for example, core photos are obtained by well log software to be displayed along with other depth-indexed well logs for visualization and interpretation. However, as image interpretation and characterization may be subjective and qualitative when performed by geologists, some embodiments are contemplated that provide an automated and quantitative workflow for determining and/or predicting facies and rock properties. For example, information associated with geological/petrophysical/geomechanical/geochemical properties may be associated with a particular location where a core plug or core specimen is acquired. However, this particular location may not be representative of an entire core, geological region, or reservoir region. This bias may thus result in inaccurate interpolations between discrete data points (i.e., core samples). Thus, some embodiments provide a continuous visual analysis of core image data, e.g., using a sliding window to obtain smooth quantitative image attributes at different locations.

Turning to FIG. 1, FIG. 1 shows a schematic diagram in accordance with one or more embodiments. As shown in FIG. 1, FIG. 1 illustrates a well environment (100) that may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation porosity, formation permeability, resistivity, density, water saturation, total organic content, volume of kerogen, Young's modulus, Poisson's ratio and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 1, the well environment (100) may include a drilling system (110), a logging system (112), a control system (114), and a reservoir properties estimator (160). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Turning to the reservoir properties estimator (160), a reservoir properties estimator (160) may include hardware and/or software with functionality for storing and analyzing well logs (140), core sample data (150), seismic data, and/or other types of data to generate and/or update one or more geological models (175). Geological models may include geochemical or geomechanical models that describe structural relationships within a particular geological region. While the reservoir properties estimator (160) is shown at a well site, in some embodiments, the reservoir properties estimator (160) may be remote from a well site. In some embodiments, the reservoir properties estimator (160) is implemented as part of a software platform for the control system (114). The software platform may obtain data acquired by the drilling system (110) and logging system (112) as inputs, which may include multiple data types from multiple sources. The software platform may aggregate the data from these systems (110, 112) in real time for rapid analysis. In some embodiments, the control system (114), the logging system (112), and/or the reservoir properties estimator (160) may include a computer system that is similar to the computer system (1002) described below with regard to FIG. 10 and the accompanying description.

The logging system (112) may include one or more logging tools (113), such as a nuclear magnetic resonance (NMR) logging tool and/or a resistivity logging tool, for use in generating well logs (140) of the formation (106). For example, a logging tool may be lowered into the wellbore (104) to acquire measurements as the tool traverses a depth interval (130) (e.g., a targeted reservoir section) of the wellbore (104). The plot of the logging measurements versus depth may be referred to as a "log" or "well log". Well logs (104) may provide depth measurements of the well (102) that describe such reservoir characteristics as formation porosity, formation permeability, resistivity, density, water saturation, total organic content, volume of kerogen, Young's modulus, Poisson's ratio, and the like. The resulting logging measurements may be stored and/or processed, for example, by the control system (114), to generate corresponding well logs (140) for the well (102). A well log may include, for example, a plot of a logging response time versus true vertical depth (TVD) across the depth interval (130) of the wellbore (104).

Reservoir characteristics may be determined using a variety of different techniques. For example, certain reservoir characteristics can be determined via coring (e.g., physical extraction of rock samples) to produce core samples and/or logging operations (e.g., wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores" or "core samples") from the formation (106) and bring the plugs to the surface, and these core samples may be analyzed at the surface (e.g., in a lab) to determine various characteristics of the formation (106) at the location where the sample was obtained.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs. In general, sound waves may travel faster through high-density shales than through lower-density sandstones. Likewise, density logging may also determine density measurements or porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores. In some embodiments, gamma ray logging is used to measure naturally occurring gamma radiation to characterize rock or sediment regions within a wellbore. In particular, different types of rock may emit different amounts and different spectra of natural gamma radiation. For example, gamma ray logs may distinguish between shales and sandstones/carbonate rocks because radioactive potassium may be common to shales. Likewise, the cation exchange capacity of clay within shales also results in higher absorption of uranium and thorium further increasing the amount of gamma radiation produced by shales.

Keeping with the various types of logging techniques, resistivity logging may measure the electrical resistivity of rock or sediment in and around the wellbore (104). In particular, resistivity measurements may determine what types of fluids are present in the formation (106) by measuring how effective these rocks are at conducting electricity. Because fresh water and oil are poor conductors of electricity, they have high resistivities. As such, resistivity measurements obtained via such logging can be used to determine corresponding reservoir water saturation ($S_w$).

Another type of logging technique includes dielectric logging. For example, dielectric permittivity may be defined as a physical quantity that describes the propagation of an electromagnetic field through a dielectric medium. As such, dielectric permittivity may describe a physical medium's ability to polarize in response to an electromagnetic field, and thus reduce the total electric field inside the physical medium. In a portion of reservoir rock, water may have a large dielectric permittivity that is higher than any associated rock or hydrocarbon fluids within the portion. In particular, water permittivity may depend on a frequency of an electromagnetic wave, water pressure, water temperature, and salinity of the reservoir rock mixture.

Another type of logging technique includes borehole image logging. For example, borehole image logging may be a type of wireline well logging with various data-processing methods that generate centimeter-scale images of a borehole wall and corresponding rock formations. Moreover, borehole image logging may include optical imaging, acoustic imaging, electrical imaging, and/or methods that draw on both acoustic and electrical imaging techniques using the same logging tool. Optical borehole imaging may use downhole cameras that provides a high-resolution color image of a wellbore. Acoustic borehole imaging may use borehole televiewers or ultrasonic borehole imagers that operate with pulsed acoustic energy, e.g., through short bursts of acoustic energy emitted by a rotating transducer in pulse-echo mode. Electrical borehole imaging may use microresistivity devices that include pads and flaps with an array of button electrodes at a predetermined electric potentials, where an applied voltage causes an alternating current to flow from each electrode into the formation and then to return to a specific electrode.

Furthermore, while electromagnetic waves propagate without losing energy in a vacuum, electromagnetic waves in porous reservoir rocks are attenuated and phase shifted during transmission through the rock medium. Porosity measurements from various logs (e.g., density log, neutron long, sonic long, or an NMR log) may estimate the total porosity in reservoir rocks. In contrast, a multi-frequency dielectric logging tool may determine a value of the water-filled porosity in the reservoir rock.

Figure 2:
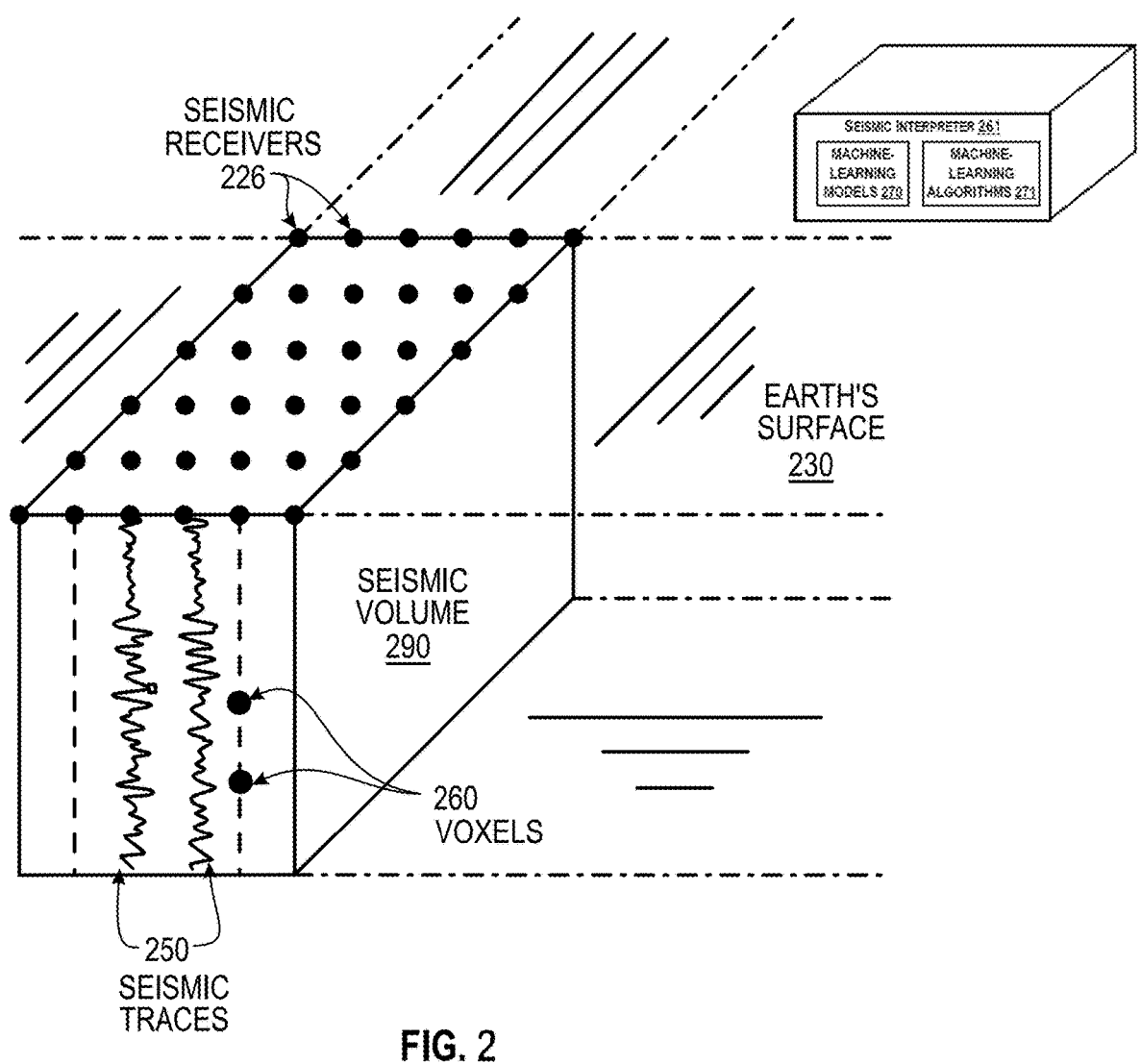

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a cubic dataset of seismic traces. In particular, seismic data may have up to four spatial dimensions, one temporal dimension (i.e., related to the actual measurements stored in the traces), and possibly another temporal dimension related to time-lapse seismic surveys. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot−Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the down-going wave-field and the receiver wave-field the up-going wave-field. In Kirchhoff and beam methods, for example, the imaging condition may include a summation of contributions resulting from the input data traces after the traces have been spread along portions of various isochrones (e.g., using principles of constructive and destructive interference to form the image).

Furthermore, seismic data processing may include various seismic data functions that are performed using various process parameters and combinations of process parameter values. For example, a seismic interpreter may test different parameter values to obtain a desired result for further seismic processing. Depending on the seismic data processing algorithm, a result may be evaluated using different types of seismic data, such as directly on processed gathers, Normal Move Out (NMO) corrected stacks of those gathers, or on migrated stacks using a migration function. Where structural information of the subsurface is being analyzed, migrated stacks of data may be used to evaluate seismic noise that may overlay various geological boundaries in the subsurface, such as surface multiples (e.g., strong secondary reflections that are detected by seismic receivers). As such, migrated images may be used to determine impact of noise removal processes, while the same noise removal processes may operate on gather data.

Keeping with seismic imaging, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes various NMO gathers with amplitudes sampled from a common midpoint (CMP). In particular, a NMO correction may be a seismic imaging approximation based on calculating reflection travel times. However, NMO-stack results may not indicate an accurate subsurface geology, where the subsurface geology is complex with large heterogeneities in particle velocities or when a seismic survey is not acquired on a horizontal plane. Ocean-Bottom-Node surveys and rough topographic land seismic surveys may be examples where NMO-stack results fail to depict subsurface geologies.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Turning to the seismic interpreter (261), a seismic interpreter (261) (also called a "seismic processing system") may include hardware and/or software with functionality for storing the seismic volume (290), well logs, core sample data, and other data for seismic data processing, well data processing, training operations, and other data processes accordingly. In some embodiments, the seismic interpreter (261) may include a computer system that is similar to the computer (902) described below with regard to FIG. 9 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Keeping with the seismic interpreter (261), seismic interpreter (261) may include hardware and/or software with functionality for generating one or more machine-learning models (270) for use in analyzing seismic data and one or more subsurface formations. For example, seismic interpreter (261) may use and/or process seismic data as well as other types of data to generate and/or update one or more machine-learning models (270) and/or one or more velocity models. Thus, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include decision trees and neural networks. In some embodiments, the seismic interpreter (261) may generate augmented or synthetic data to produce a large amount of interpreted data for training a particular model. With respect to the seismic interpreter (261), a seismic interpreter (261) may include a processor and hardware and/or software with functionality for interpreting, processing, and/or acquiring seismic data. In some embodiments, a seismic interpreter (261) is a component within a reservoir properties estimator (e.g., reservoir properties estimator (160)).

Returning to FIG. 1, geosteering may be used to position the drill bit or drill string of the drilling system (110) relative to a boundary between different subsurface layers (e.g., overlying, underlying, and lateral layers of a pay zone) during drilling operations. In particular, measuring rock properties during drilling may provide the drilling system (110) with the ability to steer the drill bit in the direction of desired hydrocarbon concentrations. As such, a geosteering system may use various sensors located inside or adjacent to the drilling string to determine different rock formations within a well path. In some geosteering systems, drilling tools may use resistivity or acoustic measurements to guide the drill bit during horizontal or lateral drilling.

Returning to a reservoir properties estimator (160), a reservoir properties estimator (160) may include hardware and/or software with functionality for generating one or more machine-learning models (170) for use in analyzing the formation (106). For example, the reservoir properties estimator (160) may store well logs (140) and data regarding core samples (150), and further analyze the well log data, the core sample data, seismic data, and/or other types of data to generate and/or update one or more machine-learning models (170) and/or one or more geological models (175). Thus, different types of machine-learning models may be trained, such as convolutional neural networks, deep neural networks, recurrent neural networks, support vector machines, decision trees, inductive learning models, deductive learning models, supervised learning models, etc. In some embodiments, the reservoir properties estimator (160) may generate augmented or synthetic data to produce a large amount of interpreted data for training a particular model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Keeping with FIG. 1, a well path of a wellbore (104) may be updated by the control system (114) using a geological model (e.g., one of the geological models (175)). For example, a control system (114) may communicate geosteering commands to the drilling system (110) based on well data updates that are further adjusted by the reservoir properties estimator (160) using a geological model. As such, the control system (114) may generate one or more control signals for drilling equipment based on an updated well path design and/or a geological model. In some embodiments, the reservoir properties estimator (160) determines one or more formation top depths from seismic data and/or well log data. The reservoir properties estimator (160) may use these formation top depths to adjust the well path of the wellbore (104) accordingly.

While FIGS. 1 and 2 shows various configurations of components, other configurations may be used without departing from the scope of the disclosure. For example, various components in FIGS. 1 and 2 may be combined to create a single component. As another example, the functionality performed by a single component may be performed by two or more components.

Figure 3:
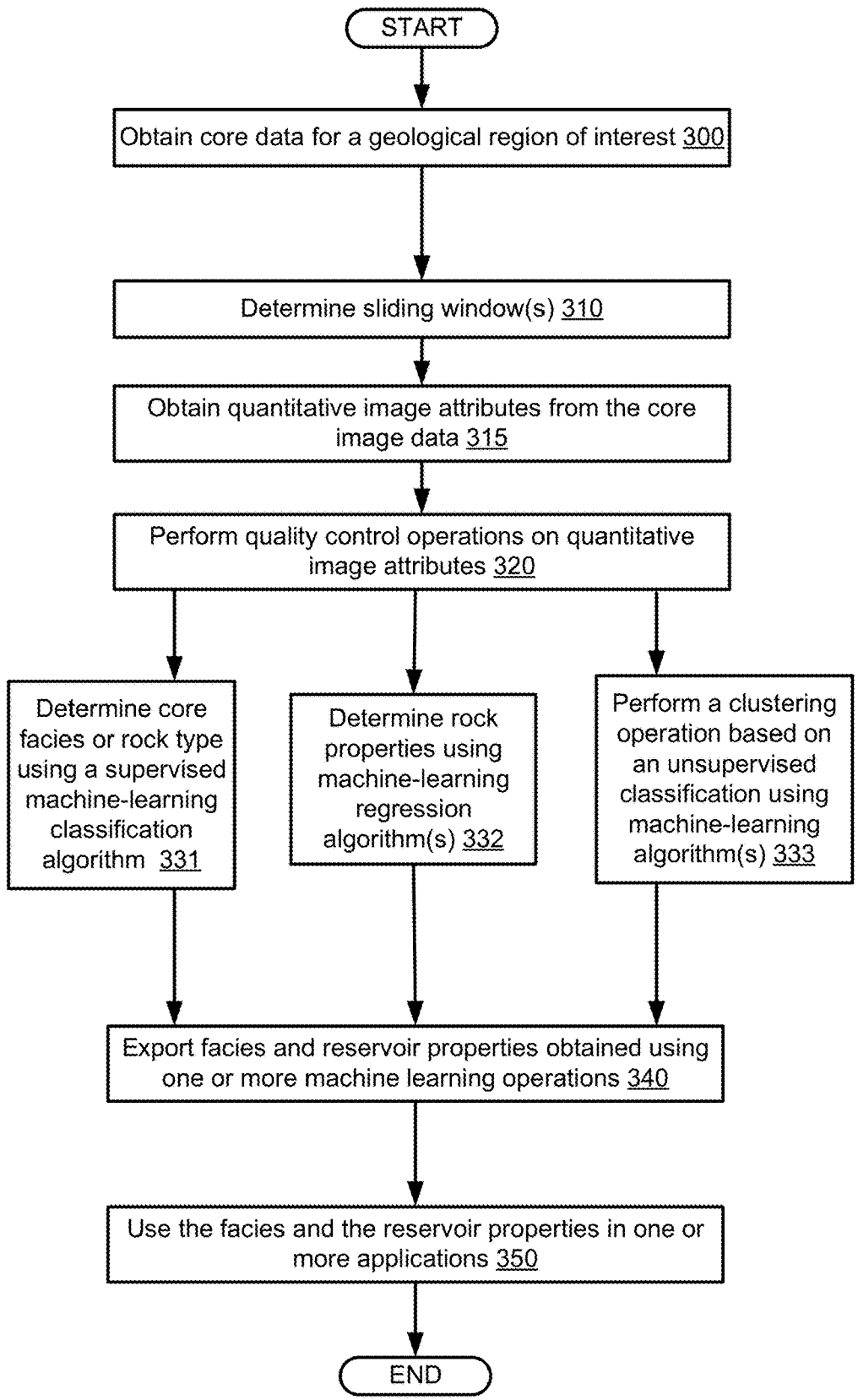
FIG. 3 shows a flowchart in accordance with one or more embodiments of the technology.

Turning to FIG. 3, FIG. 3 shows a flowchart in accordance with one or more embodiments. Specifically, FIG. 3 describes a general method for determined reservoir properties and facies using machine learning. One or more blocks in FIG. 3 may be performed by one or more components (e.g., reservoir properties estimator (160)) as described in FIGS. 1 and/or 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, core data are obtained in accordance with one or more embodiments. For example, a reservoir properties estimator may import core photographs and other digital images that are converted into depth-indexed image logs. Likewise, core data may include point-based core plug measurements such as petrophysical properties (e.g., grain density, porosity, permeability), geochemical properties (e.g., amount of kerogen and total organic carbon in a sample), and/or geomechanical properties (e.g., values of Poisson's ratio or Young's modulus). Core data may also include continuous core scans, such as gamma ray scans and CT scans. Core data may also include related core information, such as a type of core facies and/or one or predetermined rock types associated with a core specimen. Core data may also include log scans and/or ultrasonic data associated with a core sample.

In Block 310, quantitative image attributes are obtained from core data in accordance with one or more embodiments. For example, a reservoir properties estimator may extract quantitative attributes from a core photograph as inputs for predicting reservoir properties. Quantitative image attributes may include color data (e.g., red-green-blue (RGB) content in a particular pixel or a moving window), brightness values (e.g., values for hue, saturation, and value (HSV)), and/or texture values (e.g., values based on a texture analysis such as entropy measurement, pixel range, and/or pixel standard deviation). In some embodiments, quantitative image attributes are obtained using one or more sliding windows from core image data, e.g., continuously depth-indexed core photos. For example, the quantitative image attributes may be recorded as an array of histogram distributions of the pixel-based values acquired using a sliding window. An example of a workflow for determining quantitative image attributes using a sliding window is shown in FIG. 4.

Figure 4:
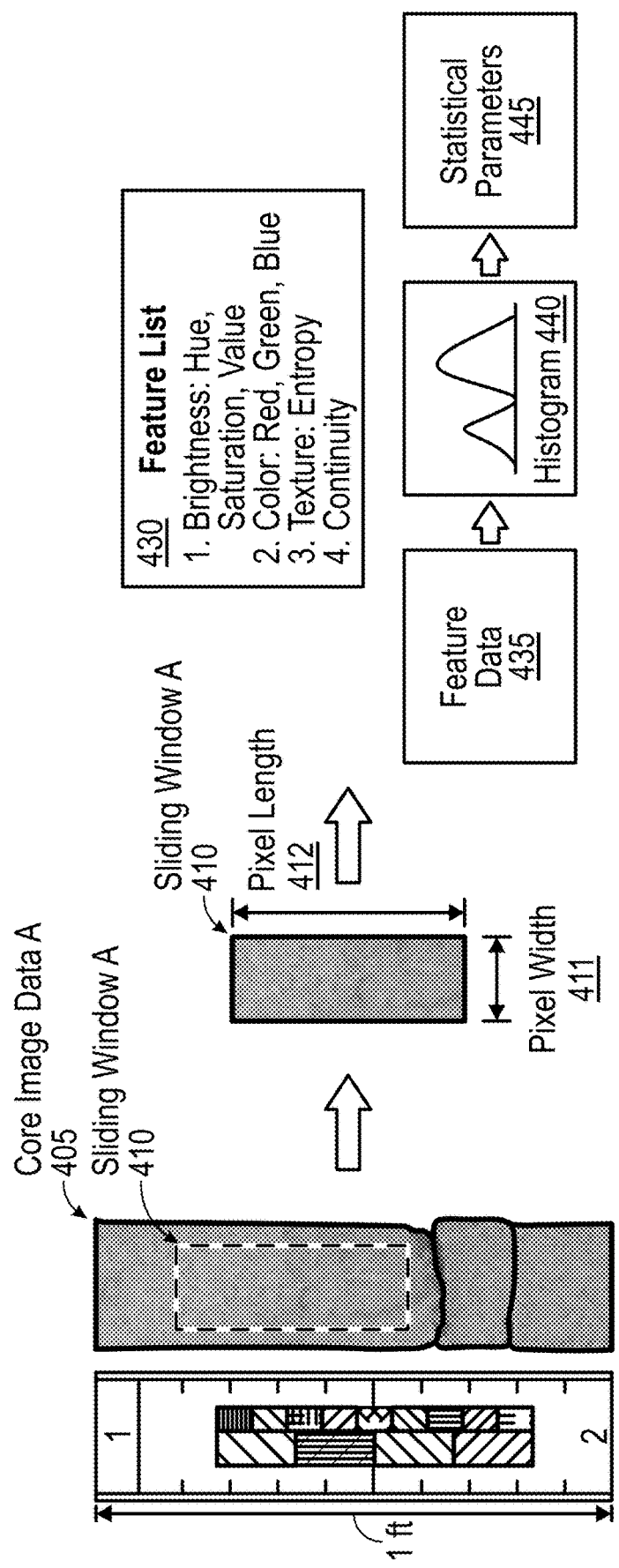
FIGS. 4, 5, 6, and 7 show examples in accordance with one or more embodiments of the technology.

Turning to FIG. 4, FIG. 4 shows an example in accordance with one or more embodiments. As shown, core image data A (405) is analyzed using a sliding window A (410), where the sliding window A (410) includes a pixel length (412) and a pixel width (411) for its window size. A reservoir properties estimator (not shown) determines feature data (435) based on various quantitative image attributes acquired based on a feature list (430). The feature data (435) is transformed into a histogram (440), where the reservoir properties estimator determines various statistical parameters (445), such as means or median values, based on the histogram (440) and feature data (435). Thus, the statistical parameters (445) are used as the final quantitative image attributes for input to a predictive data processing operation.

In Block 320, various quality control operations are performed on various quantitative image attributes in accordance with one or more embodiments. In particular, a reservoir properties estimator may remove bad data components among the core data and/or the quantitative image attributes. For example, noise or inaccurate data may correspond to an empty box due to missing core specimens, removal of a whole core interval, various induced cracks or fractures that damage rock specimens, as well as various holes in core plug samples. Therefore, noisy or inaccurate data points may appear extremely bright (e.g., white data) or dark (e.g., black data) in core image data. These points may be removed by applying cutoffs to the windowed attribute histograms obtained by a sliding window. After removing such data points, mean, median, and variance values of the windowed histogram may be recorded as well. An example of a quality control operation is found in FIG. 5.

Figure 5:
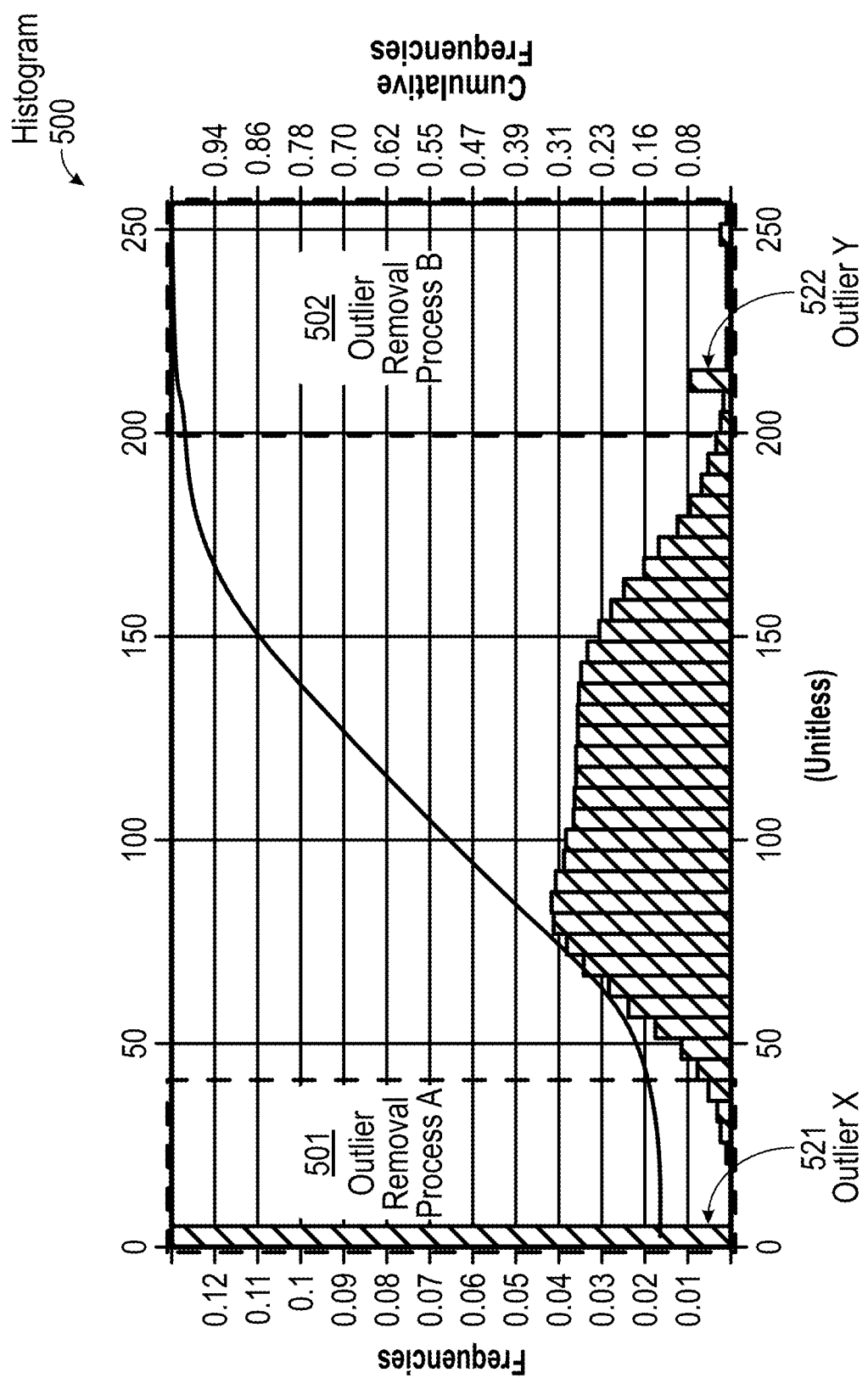
Figure 6:
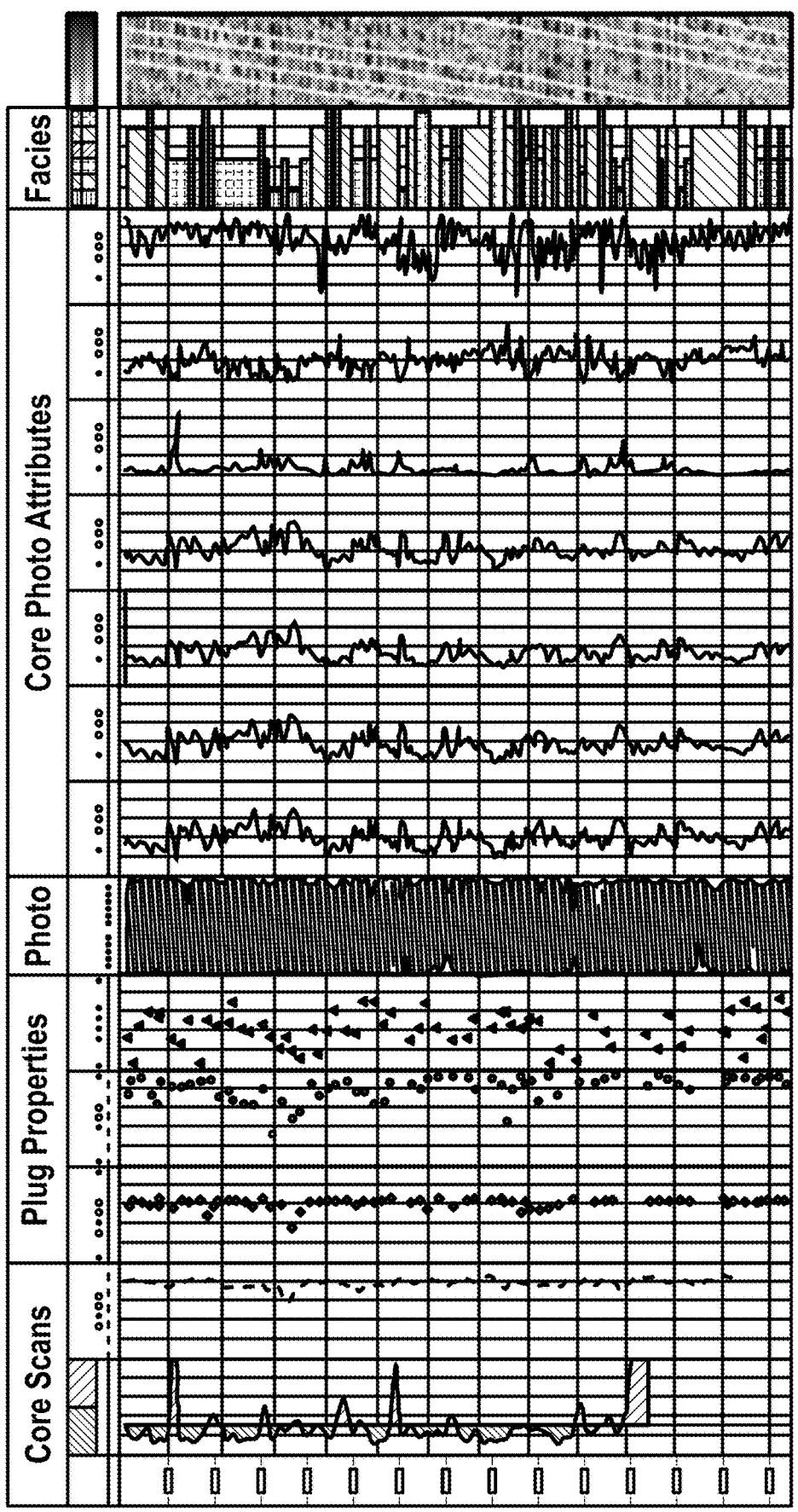

Turning to FIG. 5, FIG. 5 show an example in accordance with one or more embodiments. In FIG. 5, a histogram (500) is shown, where a reservoir properties estimator applies an outlier removal process A (501) and an outlier removal process B (502) to different bins within the histogram (500). Thus, outlier X (521) and outlier Y (522) are removed from the histogram (500) prior to determining any quantitative image attributes based on the histogram (500).

Returning to FIG. 3, in Blocks 331, 332, and/or 333, one or more machine-learning operations are performed using core data, quantitative image attributes, and/or other data (such as well logs or seismic data) in accordance with one or more embodiments. For example, seismic data may be useful for predicting various properties at a coarser scale than core sample data or well log data. Based on various input data types, multiple machine-learning options may be performed in order to obtain useful rock properties from a geological region.

In Block 331, a core facies or a rock type are determined using a supervised machine-learning classification algorithm in accordance with one or more embodiments. For example, a supervised classification algorithm may be used to determine a core facies or perform rock type labeling. For input to a machine-learning algorithm, for example, a reservoir properties estimator may obtain quantitative image attributes including RGB values, hue values, saturation values, and/or entropy values (e.g., using a moving window), core scans or well logs, and/or core facies or rock types labels based on other measurements. The supervised classification algorithm may be used with a machine-learning model, such as an artificial neural network, a random forest, a support vector machine, etc. The output of the supervised classification algorithm may be one or more predetermined classes corresponding to a specific rock type or a specific facies type. In some embodiments, the output of the machine-learning model is indexed by depth.

Figure 7:
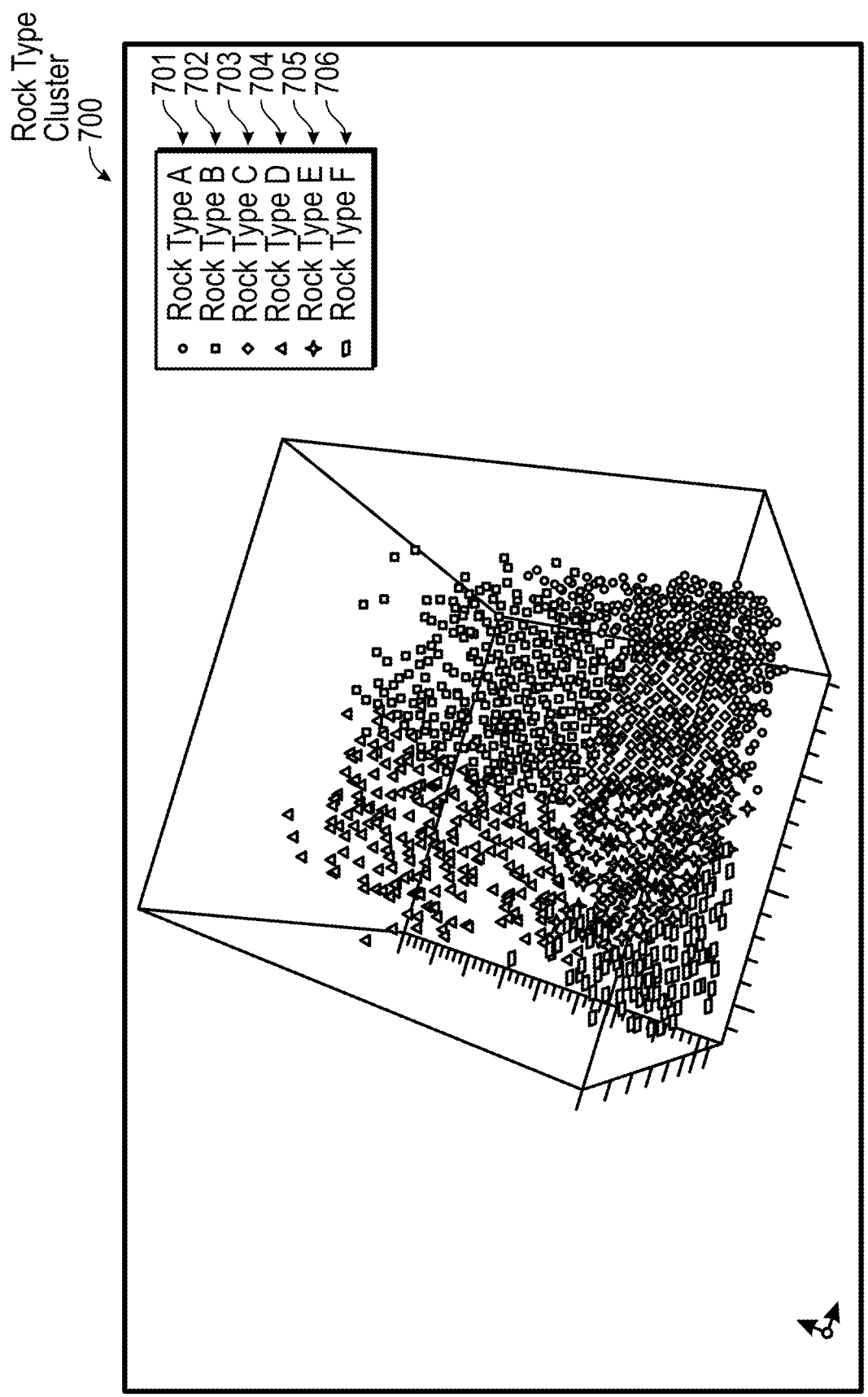

Turning to FIG. 7, FIG. 7 illustrates a field example showing the clustering of various visual rock types (VRTs) (e.g., rock type A (701), rock type B (702), rock type C (703), rock type D (704), rock type E (705), and rock type F (706)) from performing K-nearest neighbors algorithms. Thus, the visual rock types may form a rock type cluster (700) that corresponds to a particular geological region of interest. For example, the K-nearest neighbor algorithm may be based on three principle components of the quantitative image attributes. Likewise, the k-nearest neighbors (k-NN) algorithm may be a non-parametric classification algorithm or a regression algorithm. Thus, the algorithm's inputs may include the k closest training examples within a feature set, while the algorithm's output may depend on whether the k-NN algorithm is used for classification or regression. For a k-NN classification example, the output may be one or more predetermined class types. In other words, an object may be classified by a plurality vote of multiple neighbor nodes, with the object being assigned to the class most common (e.g., in greatest proximity) among its k nearest neighbor nodes. If there is only a single nearest neighbor node, then the object may be simply assigned to the corresponding class of that single nearest neighbor. In a k-NN regression example, the output may be the property value for the object. As such, this property value may be the average of the values of k nearest neighbor nodes.

In Block 332, rock properties are determined using one or more machine-learning regression algorithms in accordance with one or more embodiments. For example, a machine-learning regression algorithm may be a machine-learning algorithm that predicts rock properties using a regression technique and windowed quantitative image attributes, core scans, well logs, and core plug measurements. Regression techniques may include linear regression, logistic regression, ridge regression, lasso regression (i.e., least absolute shrinkage selector operator regression), polynomial regression, stepwise regression, and/or a mixture of one or more regression techniques. A regression algorithm may be used with a machine-learning model, such as an artificial neural network, a random forest, support vector machine, etc. The output of the machine-learning model may be predicted rock properties that may be indexed by depth. In some embodiments, the machine-learning regression algorithm is a k-nearest neighbors algorithm as described above in FIG. 7.

In Block 333, a cluster operation is performed based on an unsupervised classification using one or more machine-learning algorithms in accordance with one or more embodiments. For example, one or more machine-learning clustering algorithms are performed to classify a core sample as one or more visual rock types (VRT) in accordance with one or more embodiments. For example, an unsupervised classification may be performed using an unsupervised machine-learning algorithm. Example machine-learning algorithms may include K-means algorithms, Gaussian Mixture Model (GMM), etc. In some embodiments, for example, windowed core photo attributes (e.g., RGB values, hue, saturation, value, and entropy values) are input to a machine-learning algorithm and various clusters of visual rock types are output. In particular, the visual rock types may be indexed by depth in the output data.

In Block 340, facies and reservoir properties are exported that are obtained using one or more machine-learning operations in accordance with one or more embodiments. For example, a reservoir properties estimator may visualize and export various classification and regression results of predicted rock types and predicted rock properties to data files. In some embodiments, Blocks 300-340 follow a workflow that includes a data preparation step, followed by a machine-learning step, and subsequently a visualization and export step for predicted rock data.

In Block 350, facies and reservoir properties are used in one or more applications. For example, predicted data from a machine-learning model may be used to update a geological model of a region of interest. Likewise, predicted data may be used to determine a well path within a subsurface for a geosteering operation in connection to a drilling system. In another embodiment, the predicted data is used in determining the presence of hydrocarbon deposits within a geological region, e.g., to determine whether the quantity of hydrocarbon deposits warrants drilling one or more production wells.

While FIG. 3 above illustrates one example workflow using core data and one or more machine-learning algorithms, other workflows are also contemplated. For example, another example workflow include the following steps: (1) importing core photos and convert the core photos to depth-indexed image logs; (2) derive quantitative image attributes from the depth-indexed core photos; (3) load core-based facies types, reservoir property, and gamma ray data; (4) load well logs and perform core to log depth matching as well as one or more quality control operations; (5) a machine-learning classification using an artificial neural network (ANN) where a core interval is converted into a log interval; (6) a machine-learning regression using an artificial neural network where core points are converted to a core or log interval; (7) a machine-learning clustering based on an unsupervised classification; and (8) an export is performed that exports predicted log-based facies and reservoir properties.

Figure 8:
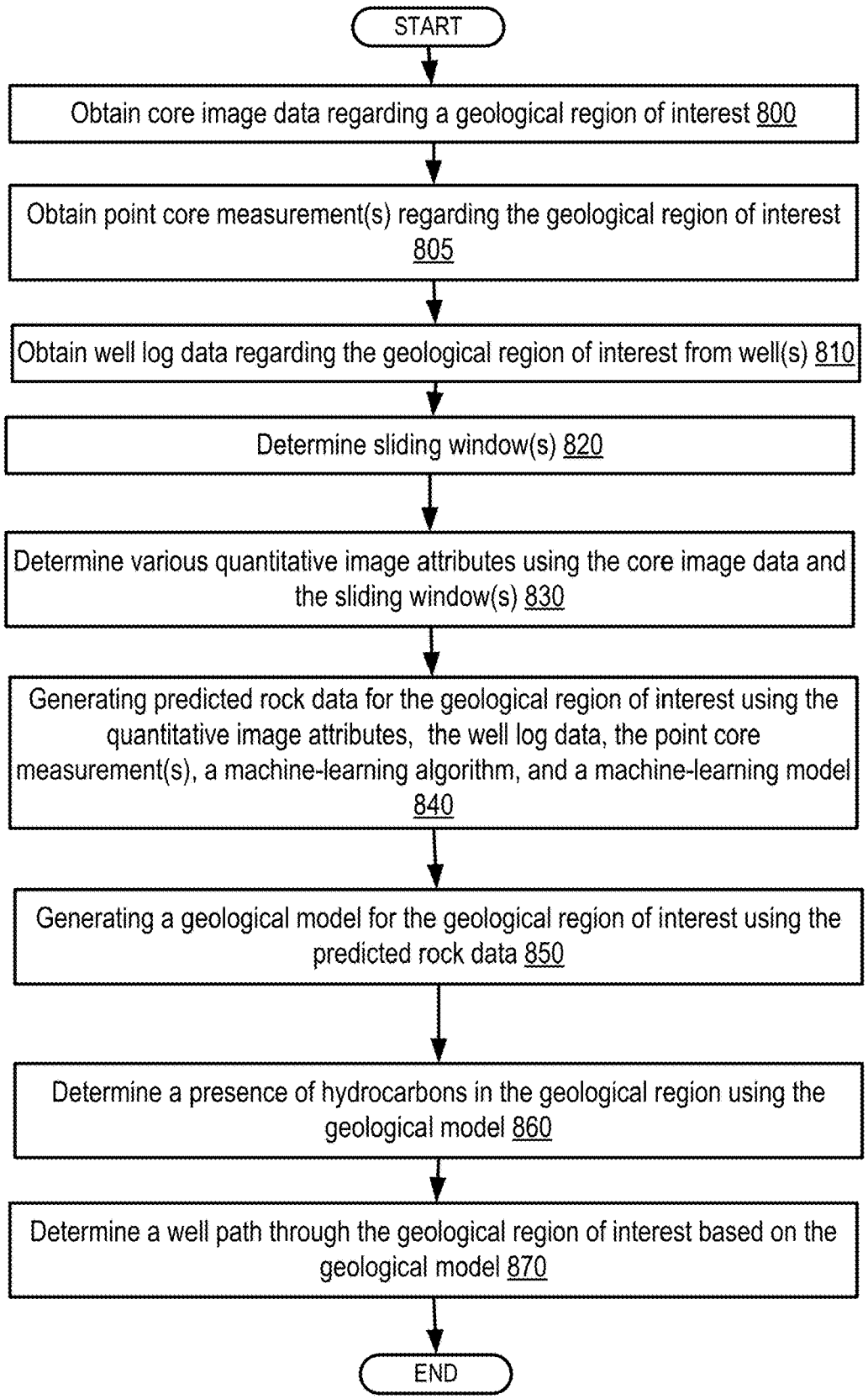
FIG. 8 shows a flowchart in accordance with one or more embodiments of the technology.

Turning to FIG. 8, FIG. 8 shows a flowchart in accordance with one or more embodiments. Specifically, FIG. 8 describes a general method for using quantitative image attributes and machine learning to determine predicted rock data. One or more blocks in FIG. 8 may be performed by one or more components (e.g., reservoir properties estimator (160)) as described in FIGS. 1 and 2. While the various blocks in FIG. 8 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 800, core image data are obtained regarding a geological region of interest in accordance with one or more embodiments. In some embodiments, core image data includes one or more core photos acquired from one or more wellbores, such as rock formation photographs. For example, a core photo may include a ten-foot core sample, such as five 2-foot sections that are acquired using a camera rotated at 360-degrees (or a camera capable of acquiring 360-degree images). Various core photos for one or more core photo may be processed to form a core image data set. As such, core image data may provide a continuous image or partitioned images of a rock formation. Likewise, core image data may include other information, such as well information (e.g., which well or location in a reservoir region is the source of the core image data), depth information (e.g., the true vertical depth of the camera that acquired the original core photo), time information (e.g., the date or time that the core photo was acquired), etc., where the related information may be stored in image headers, metadata, etc.

Furthermore, a geological region of interest may be a portion of a geological area or volume that includes one or more formations of interest desired or selected for analysis, e.g., for determining a location of hydrocarbons or a place for a stimulation treatment. For example, a geological region of interest may be a specific formation being analyzed for one or more new wells.

In Block 805, one or more point core measurements are obtained regarding a geological region of interest in accordance with one or more embodiments. Rather than acquiring a continuous log of well data, point core measurement may be based on analyzed core samples, such as core plugs, that are acquired from one or more wells. After analyzing a core sample, such as in a laboratory, various point core measurements may be determined such as grain density, porosity, permeability, kerogen content, total organic carbon content, Poisson's ratio, and Young's modulus.

In Block 810, well log data are obtained regarding a geological region of interest from one or more wells in accordance with one or more embodiments. In some embodiments, for example, the well log data may be similar to the well log (140) described above in FIG. 1 and the accompanying description.

In Block 820, one or more sliding windows are determined in accordance with one or more embodiments. In some embodiments, for example, a sliding window is a software tool for analyzing image data that one or more resolutions based on various window sizes. For example, a window size may correspond to a two-dimensional pixel area that determines the input data for a data processing operation, such as determining quantitative image attributes. As such, a sliding window may analyzing different overlapping portions of a core image data set to determine different quantitative image attributes.

In Block 830, various quantitative image attributes are determined using core image data and one or more sliding windows in accordance with one or more embodiments. For example, quantitative image attributes may be based on values in different types of color spaces, such as a red-green-blue (RGB) color space, an HSL color space (i.e., for hue, saturation, lightness) and an HSV color space (i.e., for hue, saturation, value). Likewise, quantitative image attributes may also be based on various texture analysis of texture within an image using various local statistical measures such as entropy, pixel range, and pixel standard deviation.

In some embodiments, a reservoir properties estimator determines a histogram based on different outputs of a sliding window at different locations in an image. For example, a histogram may be organize a group of sliding window outputs into various bins (e.g., a respective bin may correspond to a different location of a siding window on a core image dataset). Some histograms may be similar to bar graphs, where the histogram may condense a data series into visual interpretation or for further data processing. In other words, a histogram may correspond to a distribution of sliding window outputs that may be further analyzing according to various statistical parameters, such as means, medians, variance, or standard deviation.

In Block 840, predicted rock data are determined for a geological region of interest using various quantitative image attributes, well log data, one or more point core measurements, a machine-learning algorithm, and a machine-learning model in accordance with one or more embodiments. In some embodiments, seismic data is also used as an input to the machine-learning model.

In some embodiments, the machine-learning model is a neural network model that obtains quantitative image attributes and the well log data as inputs to an input layer. The neural network model may subsequently output a predetermined facies at the output layer as an output class based on the inputs. Likewise, the machine-learning algorithm may a supervised classification algorithm that trains the neural network model.

In some embodiments, the machine-learning algorithm includes a K-means clustering algorithm that outputs the machine-learning model. The machine-learning model may include various clusters that are organized according to one or more visual rock types (VRTs) that are indexed by depth. For example, a red cluster may correspond to one type of facies, while a blue cluster may correspond to a different type of facies.

In some embodiments, the machine-learning algorithm includes a K-nearest neighbors algorithm. The machine-learning model may include various neighbor nodes corresponding to various rock types. The machine-learning model may output the predicted rock data based on a proximity of various quantitative image attributes and the well log data to one or more neighbor nodes.

In some embodiments, the machine-learning algorithm includes a regression algorithm. For example, the regression algorithm may perform regression predictive modeling that approximates a mapping function from one or more input variables to a continuous output variable, such as depth in a geological region. Likewise, the regression algorithm may convert point core measurements (in addition to other input data) to continuous values within one or more depth intervals. In other words, a regression algorithm may be used to determine different porosity values across a depth interval using quantitative image attributes, point core measurements, and other data, such as well log data or seismic data.

In Block 850, a geological model is generated for a geological region of interest using predicted rock data in accordance with one or more embodiments.

In Block 860, a presence of hydrocarbons are determined in a geological region of interest using a geological model in accordance with one or more embodiments.

In Block 870, a well path is determined through a geological region of interest based on a geological model in accordance with one or more embodiments.

Figure 9:
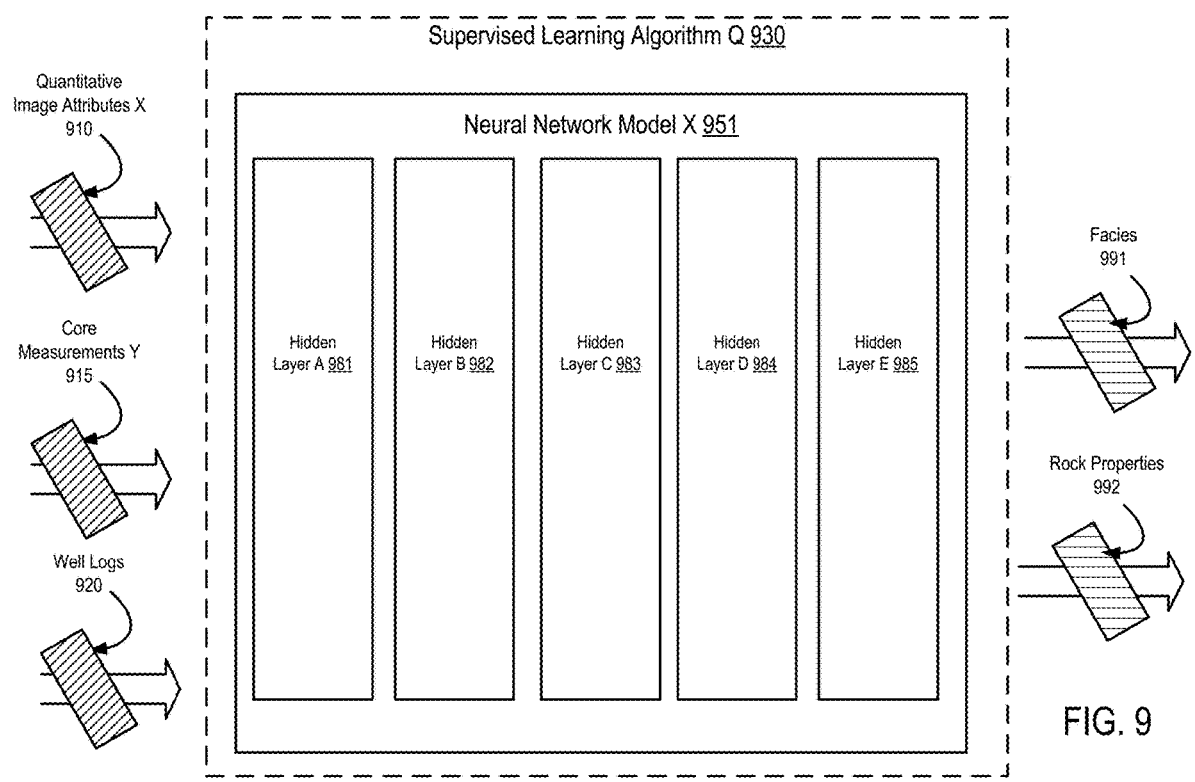
FIG. 9 shows an example in accordance with one or more embodiments of the technology.
Figure 10:
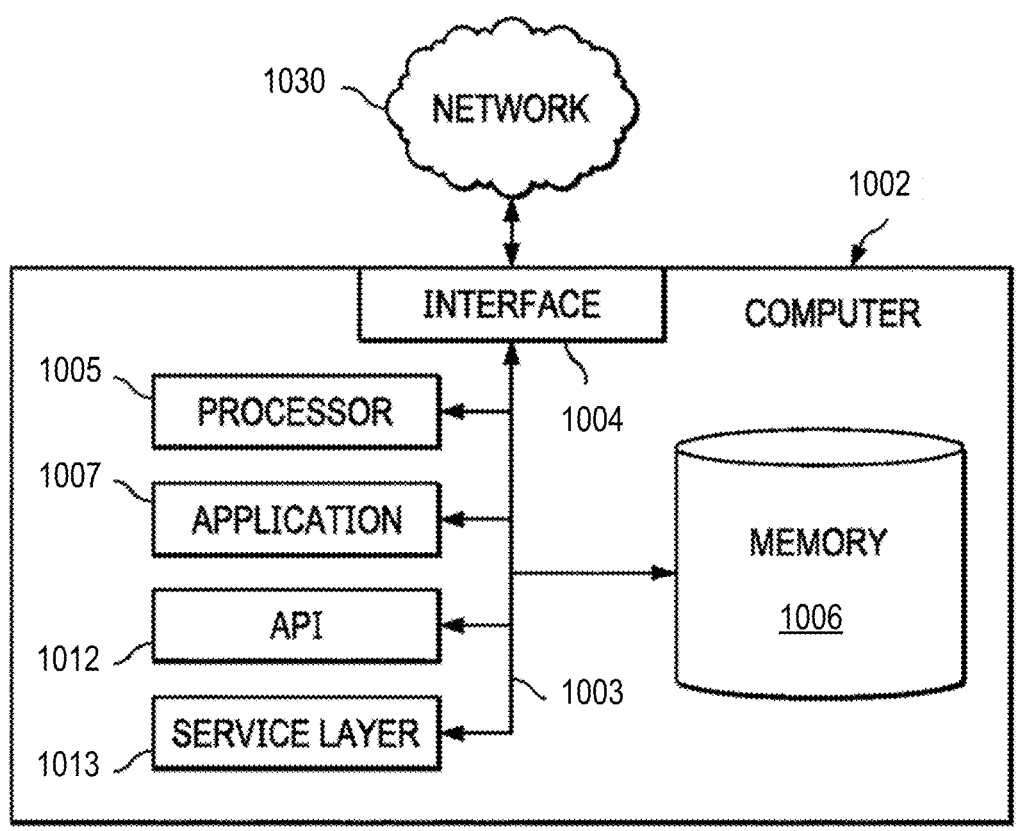
FIG. 10 shows a computing system in accordance with one or more embodiments of the technology.

Turning to FIG. 9, FIG. 9 provides an example of generating a machine-learning model to predict rock facies and rock properties in accordance with one or more embodiments. The following example is for explanatory purposes only and not intended to limit the scope of the disclosed technology. In FIG. 10, a neural network model X (951) is trained using a supervised learning algorithm Q (930) for predicting various facies (e.g., facies (991)) and rock properties (e.g., rock properties (992)). In particular, the neural network model X (951) includes five hidden layers (i.e., hidden layer A (981), hidden layer B (982), hidden layer C (983), hidden layer D (984), hidden layer E (985)), which may be convolutional layers, dilational layers, and/or various other hidden layer types. Moreover, the neural network model X (951) obtains three different input variables for determining the predicted outputs (i.e., quantitative image attributes X (910), core measurements Y (915), and well logs (920)) as inputs for training and machine-learning. However, other embodiments are contemplated that use other input variables, such as core scans, seismic data, core image data, data that has been preprocessed with a quality control operation, etc.

Embodiments may be implemented on a computer system. FIG. 10 is a block diagram of a computer system (1002) used to provide computational functionalities associated with described algorithms, methods, functions, processes, flows, and procedures as described in the instant disclosure, according to an implementation. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030) or cloud. In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) or cloud from a client application (for example, executing on another computer (1002)) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or other suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030) or cloud. Generally, the interface (1004 includes logic encoded in software or hardware (or a combination of software and hardware) and operable to communicate with the network (1030) or cloud. More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005).

Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030) or cloud. For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), each computer (1002) communicating over network (1030). Further, the term "client," "user," and other appropriate terminology may be used interchangeably as appropriate without departing from the scope of this disclosure.

Moreover, this disclosure contemplates that many users may use one computer (1002), or that one user may use multiple computers (1002).

In some embodiments, the computer (1002) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method comprising:
   obtaining, by a computer processor, core image data regarding a geological region of interest;
   obtaining, by the computer processor, well log data regarding the geological region of interest from one or more wells;
   determining, by the computer processor, a sliding window that corresponds to a predetermined window size;
   determining, by the computer processor, a plurality of quantitative image attributes using the core image data, the well log data, and the sliding window,
   wherein the plurality of quantitative image attributes are selected from a group consisting of color values, hue values, saturation values, and entropy values, and
   wherein the plurality of quantitative image attributes are determined in a continuous manner by moving the sliding window along the core image data; and
   generating, by the computer processor, predicted rock data for the geological region of interest using the plurality of quantitative image attributes, a machine-learning algorithm, and a machine-learning model,
   wherein the machine-learning algorithm comprises a K-means clustering algorithm that outputs the machine-learning model, and
   wherein the machine-learning model comprises a plurality of clusters that are organized according to one or more visual rock types (VRTs) that are indexed by depth.

2. The method of claim 1,
   wherein the machine-learning algorithm comprises a regression algorithm, and
   wherein the predicted rock data comprises one or more predicted rock properties at a predetermined depth in the geological region of interest.

3. The method of claim 1, further comprising:
   determining, by the computer processor and using the sliding window, a histogram comprising a plurality of bins,
   wherein a respective bin among the plurality of bins corresponds to the sliding window at a respective portion of the core image data, and
   wherein a quantitative image attribute among the plurality of quantitative image attributes is a statistical parameter of the histogram, the statistical parameter being selected from a group consisting of a mean value, a median value, and a variance value.

4. The method of claim 1,
   where the predetermined window size is a two-dimensional pixel area,
   wherein the sliding window generates a first quantitative image attribute for a first area of the core image data and a second quantitative image attribute for a second area of the core image data, and
   wherein a portion of the first area overlaps with a portion of the second area.

5. The method of claim 1, further comprising:
   performing a quality control operation on the plurality of quantitative image attributes,
   wherein the quality control operation removes at least one outlier from the plurality of quantitative image attributes using a cutoff threshold.

6. The method of claim 1,
   wherein the predicted rock data comprises a predicted rock facies at a predetermined depth in the geological region of interest.

7. The method of claim 1, further comprising:
   obtaining, by the computer processor, a point core measurement at a predetermined depth in the geological region of interest, the point core measurement being selected from a group consisting of grain density, porosity, permeability, kerogen content, total organic carbon content, Poisson's ratio, and Young's modulus,
   wherein the predicted rock data is generated by the machine-learning model using the point core measurement.

8. The method of claim 1, further comprising:
   generating, by the computer processor, a geological model using the predicted rock data; and
   determining, by the computer processor, a well path through the geological region of interest based on the geological model.

9. A system, comprising:
   a logging system coupled to a logging tool;
   a well system coupled to the logging system and a wellbore; and
   a reservoir properties estimator comprising a computer processor, wherein the reservoir properties estimator is coupled to the logging system and the well system, the reservoir properties estimator comprising functionality for:
      obtaining core image data regarding a geological region of interest;
      obtaining well log data regarding the geological region of interest from one or more wells;
      determining a sliding window that corresponds to a predetermined window size;

determining a plurality of quantitative image attributes using the core image data, the well log data, and the sliding window,
wherein the plurality of quantitative image attributes are determined in a continuous manner by moving the sliding window along the core image data; and
generating predicted rock data for the geological region of interest using the plurality of quantitative image attributes, a machine-learning algorithm, and a machine-learning model,
wherein the machine-learning algorithm comprises a K-means clustering algorithm that outputs the machine-learning model, and
wherein the machine-learning model comprises a plurality of clusters that are organized according to one or more visual rock types (VRTs) that are indexed by depth.

10. The system of claim 9,
wherein the machine-learning algorithm comprises a regression algorithm, and
wherein the predicted rock data comprises one or more predicted rock properties at a predetermined depth in the geological region of interest.

11. The system of claim 9, wherein the reservoir properties estimator further comprises functionality for:
determining, using the sliding window, a histogram comprising a plurality of bins,
wherein a respective bin among the plurality of bins corresponds to the sliding window at a respective portion of the core image data, and
wherein a quantitative image attribute among the plurality of quantitative image attributes is a statistical parameter of the histogram, the statistical parameter being selected from a group consisting of a mean value, a median value, and a variance value.

12. A non-transitory computer readable medium storing instructions executable by a computer processor, the instructions comprising functionality for:
obtaining core image data regarding a geological region of interest;
obtaining well log data regarding the geological region of interest from one or more wells;
determining a sliding window that corresponds to a predetermined window size;
determining a plurality of quantitative image attributes using the core image data, the well log data, and the sliding window,
wherein the plurality of quantitative image attributes are determined in a continuous manner by moving the sliding window along the core image data; and
generating predicted rock data for the geological region of interest using the plurality of quantitative image attributes, a machine-learning algorithm, and a machine-learning model,
wherein the machine-learning algorithm comprises a K-means clustering algorithm that outputs the machine-learning model, and
wherein the machine-learning model comprises a plurality of clusters that are organized according to one or more visual rock types (VRTs) that are indexed by depth.

13. The non-transitory computer readable medium of claim 12, the instructions further comprising functionality for:
determining, using the sliding window, a histogram comprising a plurality of bins,
wherein a respective bin among the plurality of bins corresponds to the sliding window at a respective portion of the core image data, and
wherein a quantitative image attribute among the plurality of quantitative image attributes is a statistical parameter of the histogram, the statistical parameter being selected from a group consisting of a mean value, a median value, and a variance value.

14. The non-transitory computer readable medium of claim 12, the instructions further comprising functionality for:
generating, by the computer processor, a geological model using the predicted rock data; and
determining, by the computer processor, a well path through the geological region of interest based on the geological model.

* * * * *